(12) United States Patent
Stevens et al.

(10) Patent No.: US 7,661,707 B2
(45) Date of Patent: Feb. 16, 2010

(54) GAS GENERATING SYSTEM WITH PRESSURE REGULATOR

(75) Inventors: Bruce A. Stevens, Oakland, MI (US); Robert M. Krupp, Rochester, MI (US); Donald B. Patterson, Rochester, MI (US)

(73) Assignee: TK Holdings, Inc., Armada, MI (US)

( * ) Notice: Subject to any disclaimer, the term of this patent is extended or adjusted under 35 U.S.C. 154(b) by 0 days.

(21) Appl. No.: 11/732,851

(22) Filed: Apr. 4, 2007

(65) Prior Publication Data

US 2007/0228013 A1    Oct. 4, 2007

Related U.S. Application Data (60) Provisional application No. 60/788,920, filed on Apr. 4, 2006.

(51) Int. Cl.
B60R 21/26 (2006.01)
(52) U.S. Cl. ..................................................... 280/736
(58) Field of Classification Search ................. 280/736, 280/740, 741, 737, 742
See application file for complete search history.

(56) References Cited

U.S. PATENT DOCUMENTS

| | | | | |
|---|---|---|---|---|
| 4,021,058 A * | 5/1977 | Suzuki et al. | ................ | 280/737 |
| 4,172,465 A * | 10/1979 | Dashner | ................ | 137/533.27 |
| 4,394,033 A | 7/1983 | Goetz et al. | ................ | 280/736 |
| 5,195,777 A | 3/1993 | Cuevas | ................ | 280/736 |
| 5,257,817 A * | 11/1993 | Cuevas | ................ | 280/736 |
| 5,609,359 A | 3/1997 | Johnson et al. | ............ | 280/736 |
| 5,618,057 A | 4/1997 | Johnson et al. | ............ | 280/736 |
| 6,039,347 A | 3/2000 | Maynard | ................ | 280/736 |
| 6,062,598 A * | 5/2000 | Faigle | ................ | 280/736 |
| 6,176,518 B1 * | 1/2001 | Faigle | ................ | 280/736 |
| 6,199,905 B1 | 3/2001 | Lewis | ................ | 280/737 |
| 6,789,820 B2 * | 9/2004 | Meduvsky et al. | ......... | 280/742 |
| 2004/0041380 A1 * | 3/2004 | Jung et al. | ............. | 280/736 |
| 2005/0110254 A1 * | 5/2005 | Engler et al. | ............. | 280/736 |
| 2006/0197325 A1 | 9/2006 | Patterson | | |
| 2006/0202457 A1 * | 9/2006 | Patterson | ................ | 280/740 |
| 2007/0085309 A1 * | 4/2007 | Kelley et al. | ............... | 280/736 |
| 2007/0085311 A1 * | 4/2007 | Hofmann et al. | ........... | 280/739 |

FOREIGN PATENT DOCUMENTS

EP    570347 A2 *  11/1993

OTHER PUBLICATIONS

U.S. Appl. No. 11/365,374.

(Continued)

*Primary Examiner*—Faye M. Fleming
(74) *Attorney, Agent, or Firm*—L.C. Begin & Associates, PLLC.

(57) ABSTRACT

A gas generating system is provided including a housing and a divider for dividing an interior of the housing into a first interior portion and a second interior portion. The divider defines a fluid flow path therethrough enabling fluid communication from the first interior portion to the second interior portion. A valve mechanism is operatively coupled to the divider for constricting the fluid flow path responsive to a pressure within the first interior portion, thereby enabling the pressure within the first interior portion to be maintained within a predetermined range. A vehicle occupant protection system including the gas generating system is also disclosed.

18 Claims, 4 Drawing Sheets

OTHER PUBLICATIONS

Office Action having a mailing date of Oct. 4, 2007 regarding Publication No. US-2006/0197325 A1 (U.S. Appl. No. 11/365,374).

Office Action for U.S. Appl. No. 11/361,936, filed Feb. 23, 2006 dated for Apr. 2, 2008.

\* cited by examiner

FIG - 9

GAS GENERATING SYSTEM WITH PRESSURE REGULATOR

CROSS REFERENCE TO RELATED APPLICATIONS

This application claims the benefit of provisional application Ser. No. 60/788,920 filed on Apr. 4, 2006.

BACKGROUND OF THE INVENTION

The present invention relates to gas generating systems for vehicle airbags and, more particularly, to a gas generating system incorporating a mechanism for maintaining system combustion pressure at a value within a predetermined range.

Many solid propellants have an optimum pressure range for combustion. It can be difficult to maintain the system internal pressure within the optimum pressure range during the majority of the combustion reaction. For example, in degressive-burning propellants, the surface area of a propellant grain decreases as the propellant burns. As the grain surface area decreases, the gas generation rate correspondingly decreases. For a gas generating system in which the total aperture area for gas exit flow from the system housing is constant, a decrease in the gas generation rate will result in a decrease in housing internal pressure, thereby correspondingly reducing propellant combustion pressure. Eventually, a point is reached where the combustion pressure falls below the desired pressure range for optimum combustion.

In addition, low-pressure combustion of the propellant outside of the optimum pressure range may increase the generation of undesirable effluents. Furthermore, operating outside of the optimum combustion range may adversely affect the combustion, thereby abbreviating or shortening the burn of the propellant, or inhibiting sustained combustion of the propellant.

Thus, it is desirable to maintain the system internal pressure within the optimum range for combustion of the propellant for as much of the combustion reaction as possible. The present invention is directed to reducing the total gas exit orifice area available for gas exit flow as the gas generation rate decreases, thereby maintaining optimum combustion pressure and reducing the generation of undesirable effluents.

SUMMARY OF THE INVENTION

A gas generating system is provided including a housing and a divider for dividing an interior of the housing into a first interior portion and a second interior portion. The divider defines a fluid flow path therethrough enabling fluid communication from the first interior portion to the second interior portion. A valve mechanism is operatively coupled to the divider for constricting the fluid flow path responsive to a pressure within the first interior portion, thereby enabling the pressure within the first interior portion to be maintained at a value within a predetermined range.

In another aspect of the invention, a flow control system is provided for regulating a flow of fluid out of an enclosure responsive to a pressure within the enclosure. The flow control system includes a fluid flow path enabling fluid communication between an interior of the enclosure and an exterior of the enclosure, and a valve mechanism in operative communication with the fluid flow path for constricting the fluid flow path responsive to the pressure within the enclosure.

DETAILED DESCRIPTION

FIGS. 1-5 show cross-sectional views of one embodiment of a gas generating system 10 in accordance with the present invention. Gas generating system 10 is contemplated for use, for example, in inflating passenger-side inflatable restraint systems in motor vehicles, such as are known in the art; however, use of the gas generating system described herein is not limited thereto. Unless stated otherwise, the components of gas generating system 10 may be manufactured from known materials and by known processes.

Figure 1:
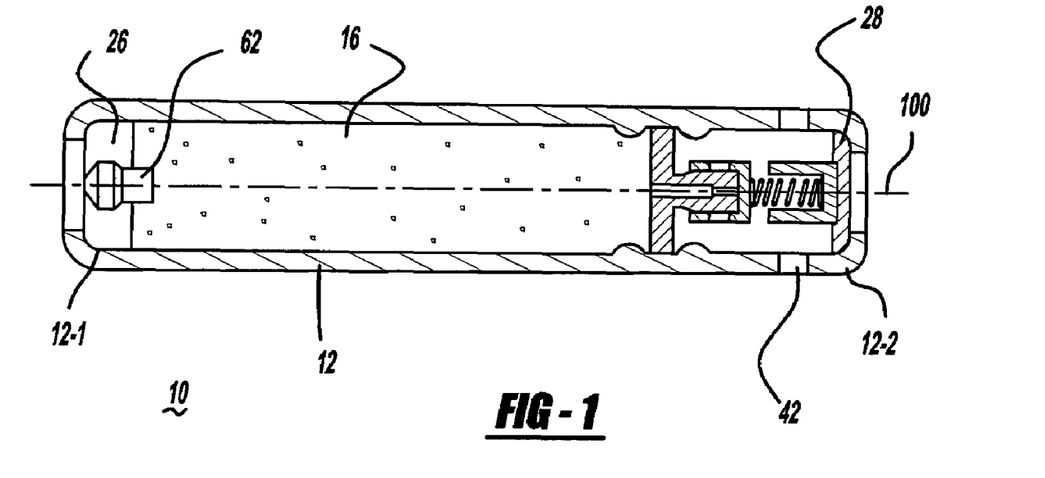
FIG. 1 is a cross-sectional side view of a gas generating system in accordance with the present invention prior to system activation.
Figure 2:
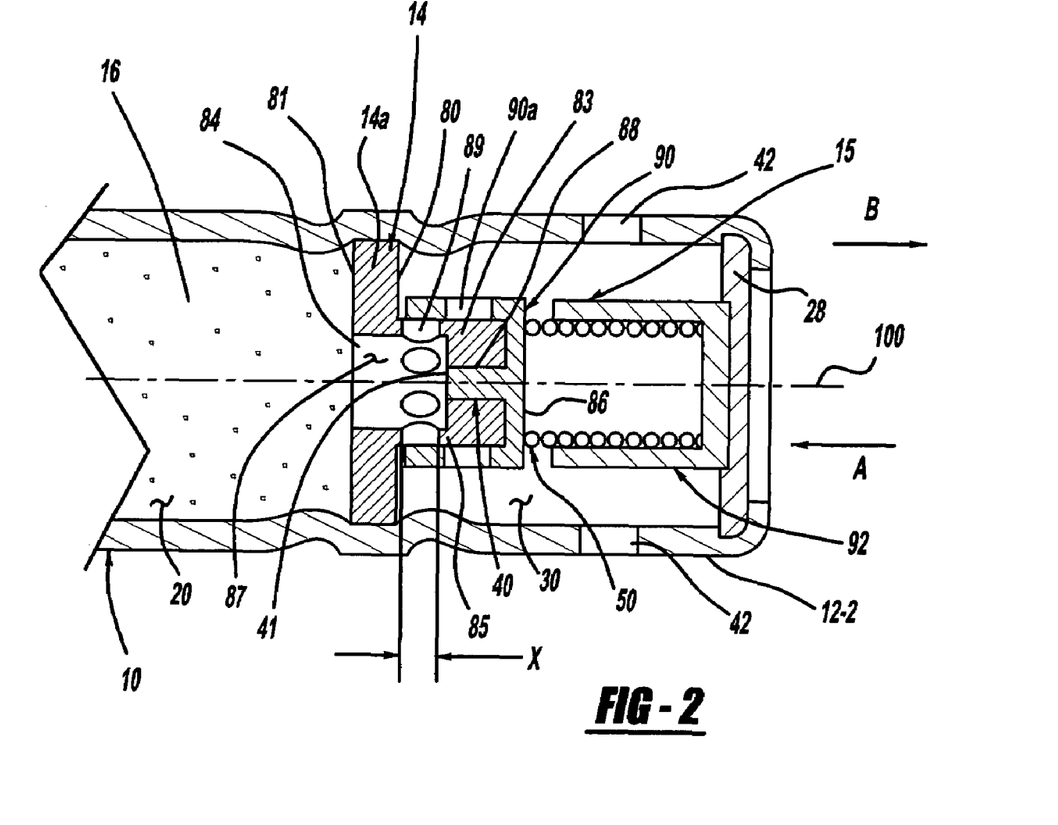
FIG. 2 is a magnified cross-sectional side view of a portion of the gas generating system of FIG. 1.

Gas generating system 10 includes an elongate, generally cylindrical housing or body 12 defining an enclosure and having a first end 12-1, a second end 12-2, and a longitudinal axis 100. At least one gas exit orifice or aperture, and more preferably a first plurality of inflation gas exit apertures, generally designated 42, are formed along end 12-2 of body 12 to enable fluid communication between an interior of the body and an associated inflatable element of a vehicle occupant protection system (for example, an airbag). Body 12 may be cast, extruded, or otherwise metal-formed. Apertures 42 may be formed along the gas generating system body by, for example, punching or piercing. In FIGS. 1 and 2, two apertures 42 are shown to illustrate the principles of the present invention. However, any desired number of apertures may be used, depending on design requirements.

Endcaps 26 and 28 are secured at opposite ends of body 12 using one or more known methods, to close the ends of the gas generating system body. In FIG. 1, ends of body 12 are crimped over portions of first and second caps 26, 28 to secure the caps within the body. Endcaps 26 and 28 may be cast, stamped, or otherwise metal-formed. Alternatively, endcaps 26 and 28 may be molded from a suitable high-temperature resistant polymer.

The gas generating system of the present invention incorporates a pressure regulation mechanism or system for maintaining a pressure in an enclosure at a value within a predetermined range. The pressure regulation system comprises a flow control system for regulating fluid flow out of an enclosure responsive to the pressure within the enclosure. The flow control system includes a fluid flow path enabling fluid communication between an interior of the enclosure and an exterior of the enclosure, and a valve mechanism in operative communication with the fluid flow path for constricting the fluid flow path responsive to the pressure within the enclosure. That is, the pressure level within the enclosure produces a corresponding valve mechanism response which, in turn, produces a corresponding constriction of the fluid flow path, thereby reducing or increasing fluid flow from the enclosure to correspondingly increase or decrease the enclosure pressure. This enables the pressure within the enclosure to be maintained within a predetermined range.

Referring to FIGS. 2-6, in one embodiment, the fluid flow path is defined by a divider 14 which divides an interior of housing 12 into a first interior portion or chamber 20, and a second interior portion 30. The fluid flow path enables fluid communication from chamber 20 to second chamber 30. A valve mechanism, generally designated 15, is operatively coupled to divider 14 for constricting the fluid flow path through the divider responsive to a pressure within chamber 20. This enables the pressure within chamber 20 to be maintained at a value within the desired predetermined range. As used herein, the term "constrict" is understood to mean "To make smaller or narrower."

In a particular embodiment, chamber 20 serves as a combustion chamber for a gas generant, and the pressure within chamber 20 is to be maintained at a value within a predetermined pressure range suitable for efficient combustion of the gas generant. Divider 14 comprises an internal wall 14a disposed within gas generating system body 12 intermediate the ends thereof, defining first and second housing interior portions or chambers 20 and 30, respectively. Wall 14a may be formed from metal, ceramic, or other material or materials capable of withstanding or resisting any ablative effects of exposure to the thermal and chemical by-products resulting from combustion of the particular gas generant used in a given application. Wall 14a is generally oriented along a plane perpendicular to longitudinal axis 100 of gas generating system body 12. Wall 14a is welded, roll-crimped, or otherwise secured within body 12 so as to maintain the wall in its position within the body when the wall is subjected to pressures generated by combustion of gas generants stored within the body. Wall 14a includes a first surface 80 facing into chamber 30 and a second surface 81 opposite first surface 80 and facing into chamber 20.

Generally, valve mechanism 15 comprises a piston 40 slidably engaged with divider 14 so as to enable fluid communication between the piston and the enclosure interior. A closure member is coupled to the piston so as to move in conjunction therewith. In the embodiment shown in FIGS. 1-6, the closure member is in the form of a sleeve 90 (described in greater detail below) affixed to piston 40. A spring member 50 is operatively coupled to the closure member for exerting a force on the closure member such that a first force exerted on piston 40 in a first direction (direction "B" in FIG. 2) due to the pressure within the enclosure interior is opposed by a second force responsive to the first force, the second force being exerted on closure member in a second direction (direction "A" in FIG. 2) substantially opposite the first direction by the spring member 50.

In the embodiments shown in FIGS. 2-6, divider 14 has a projection 83 extending from first surface 80 into chamber 30. Projection 83 has a first bore 84 formed therein extending from wall second surface 81 through a thickness of wall 14 and into projection 83. Projection 83 has a generally cylindrical sidewall 85 and an endwall 86 enclosing the first bore to define a chamber 87 therein. Projection 83 contains one or more holes 89 formed therein to enable fluid communication between the interior of enclosure 20 and the exterior of the enclosure.

A second bore or end hole 88 is formed through endwall 86 for slidably receiving piston 40 therein (as described in greater detail below.) In the embodiment shown in the Figures, end hole 88 is generally cylindrical and is sized with respect to the diameter of piston 40 so as to permit the piston to slide freely within the end hole. In addition, a plurality of circumferentially spaced-apart through side holes 89 is formed in sidewall 85, thereby enabling fluid communication between chamber 87 and an exterior of projection 83. In the embodiment shown in the Figures, side holes 89 are circumferentially spaced substantially evenly about sidewall 85. The fluid flow path through the divider is defined by chamber 87 and side holes 89. Sleeve 90 is slidably mounted on projection 83 so as to adjustably constrict the hole(s) 89 responsive to the sum of the first and second forces acting on the closure member in directions "B" and "A", respectively.

In addition, in the embodiment shown, side holes 89 are circumferentially aligned along sidewall 85 so as to be substantially coextensive along an axis of motion of piston 40 (as described in greater detail below). That is, the centers of side holes 89 are substantially aligned along a plane extending substantially perpendicular to axis 100, and the diameters or longitudinal dimensions of the side holes are substantially the same. This arrangement thus defines a longitudinal envelope "X" (see FIG. 2) within which the side holes reside. This helps to ensure that a motion of sleeve 90 (as described in greater detail below) opens a portion of each side hole 89 simultaneously.

Piston 40 is generally cylindrical and has a face 41 positioned slidingly within end hole 88 of projection 83. Piston 40 may be cast, stamped, molded, or otherwise formed from a material or materials capable of withstanding exposure to the thermal and chemical by-products of combustion of the particular gas generant used in a given application. To reduce the static and dynamic inertia of the piston during actuation, the design of piston 40 and the material from which the piston is formed may be selected to minimize the mass of the piston. This is believed to enhance the responsiveness of the pressure regulation mechanism described herein. It will be appreciated that any spring-biased gas release member such as the piston 40 that essentially performs the same function as a spring-biased pressure regulator (further described below) may be utilized.

Sleeve 90 is generally cylindrical and is affixed to piston 40. Sleeve 90 is sized to slide easily over and along projection 83. Sleeve 90 may be cast, stamped, molded, or otherwise formed from a material or materials capable of withstanding exposure to the thermal and chemical by-products of combustion of the particular gas generant used in a given application. To reduce the static and dynamic inertia of the sleeve during actuation, the design of sleeve 90 and the material from which the sleeve is formed may be selected to minimize the mass of the sleeve. This is believed to enhance the responsiveness of the pressure regulation mechanism described herein. In the embodiments shown in FIGS. 2-6, sleeve 90 also incorporates one or more pressure relief orifices, generally designated 90a. These orifices are designed to release gases which exit openings 89 into the clearance gap between projection 83 and sleeve 90, thereby limiting the contribution of these gases to movement of the sleeve during operation (as described in more detail below).

Spring member 50 is operatively coupled to endcap 28 and to sleeve 90 for exerting a biasing force on sleeve 90 acting in the direction indicated by arrow "A". Spring member 50 may have any one of several configurations, such as a coil spring, a spiral spring, a leaf spring, or any other configuration suitable for providing the required biasing force while being enclosable in chamber 30. Spring member 50 is configured to have a spring constant that enables sleeve 90 to move within gas generating system housing 12 in a predetermined manner in response to pressure variations within chamber 20 of the gas generating system body, as described in greater detail below. It will be appreciated that "operatively coupled" simply means that the spring 50 is positioned between the end cap 28 of housing 12 and the sleeve 90. Accordingly, the spring 50 may be fixed to either or both components 12 and/or 90. Alternatively, the spring 50 may simply be positioned freely between the endcap 28 and the sleeve 90.

Spring member 50 may be formed from a metal, metal alloy, ceramic, or other material or materials capable of withstanding exposure to the thermal and chemical by-products of combustion of the particular gas generant used in a given application. To reduce the static and dynamic inertia of the spring during actuation, the design of spring 50 and the material from which the spring is formed may be selected to minimize the mass of the spring. This is believed to enhance the responsiveness of the pressure regulation mechanism described herein.

In the embodiment shown in FIGS. 1-6, spring 50 is mounted in a stop member 92 secured to endcap 28 for housing a limiting sideways deflection of the spring, and for limiting a longitudinal motion of sleeve 90. Stop member 92 may be formed from a metal, metal alloy, ceramic, or other material or materials capable of withstanding exposure to the thermal and chemical by-products of combustion of the particular gas generant used in a given application.

A quantity of a propellant or gas generant composition 16 is positioned in chamber 20. Any suitable propellant might be used and exemplary compounds are disclosed, for example, in U.S. Pat. Nos. 5,872,329, 6,074,502, and 6,210,505, incorporated herein by reference. The compositions described in these patents exemplify, but do not limit, gas generant compositions useful in the described gas generator herein.

Materials from which the internal components of the gas generating system (for example piston 40, spring member 50, sleeve 90, and stop member 92) are formed may depend to some degree on the gas generant composition combusted, which determine the level of heat and the chemical make-up of the combustion products to which the components are exposed. These factors determine the erosive and ablative effects of the combustion products on system components. Examples of suitable materials for the internal components include (but are not restricted to) steels, refractory metals, ceramics, and composite materials. Conversely, the materials from which the internal components are formed may determine the type of gas generant used in the device.

Referring again to FIG. 1, end cap 26 supports an igniter 62 operatively associated with first chamber 20 (see FIG. 2) such that it can ignite gas generant composition 16 in chamber 20 in a conventional manner. The illustrated position and orientation of igniter 62 might be varied without departing from the scope of the present invention, depending on space and manufacturing requirements. Further, igniter 62 need not be positioned within gas generating system body 12. One example of an igniter suitable for the application described herein is disclosed in U.S. Pat. No. 6,009,809, incorporated herein by reference. Other igniters mountable so as to be in communication with chamber 20 may also be used.

A filter or buffer (not shown) may be incorporated into the gas generating system design for filtering particulates from gases generated by combustion of gas generant 16. The filter may also act as a heat sink to reduce the temperature of the hot inflation gas. In general, the filter is positioned within the gas generating system body intermediate the gas generant combustion chamber and housing gas exit apertures 42, to help ensure that inflation gas passes through the buffer before exiting gas generating system 10. In one embodiment, the filter is formed from one or more layers of a compressed knitted metal wire, which is commercially available from vendors such as Metex Corp. of Edison, N.J. Other, suitable materials may also be used.

During operation of the embodiments described herein, it is desired that, at a predetermined target combustion pressure (for example, the desired pressure for optimum combustion of the propellant), the force exerted by the generated gases on piston 40 balance the force exerted by spring 50 on sleeve 90. In one embodiment, this target combustion pressure is a pressure near the median of a desired pressure range. The force exerted by spring 50 on sleeve 90 depends upon the spring constant and the distance spring 50 is compressed by sleeve 90 prior to gas generating system activation. The force exerted by the generated gases on piston 40 depends upon the internal pressure in chamber 20 of housing 12 and the area of piston surface 41. The internal pressure in chamber 20 depends on, among other factors, the gas exit aperture area along projection 83 available to the gas flow, and the gas generation rate in the combustion chamber. In the embodiments shown in FIGS. 1-6, when the pressure within the enclosure interior is at a value within the predetermined range, the first force (exerted on piston surface 41) is substantially equal to the second force (exerted on sleeve 90). In a particular embodiment, the design parameters of the present invention are specified such that an internal pressure of approximately 31 MPa is maintained within the gas generating system when a force of approximately 221 N is exerted on piston 40.

In operation, the pressure regulation mechanism incorporated in gas generating system 10 is designed to maintain the gas generating system internal pressure within a specified range determined to be an optimum pressure range for combustion of gas generant 16. It is desirable to maintain the system internal pressure within this pressure range for the majority of the combustion process.

Figure 3:
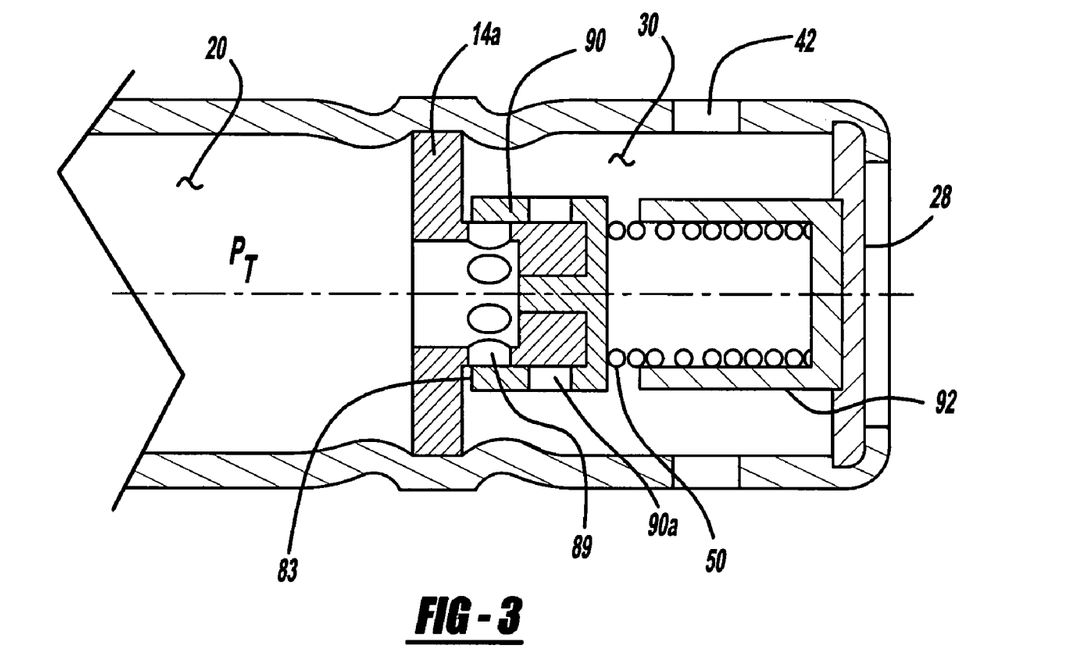
FIGS. 3-5 show various stages of operation of the gas generating system of FIGS. 1 and 2 upon activation.

Prior to activation of the gas generating system, piston 40 rests in the position shown in FIGS. 1-3. In operation, when deployment of the vehicle inflatable restraint system is desired, an activation signal is sent to igniter 62 operatively associated with first chamber 20 of the gas generating system. Gas generant 16 positioned in first chamber 20 is consequently ignited, directly or via a booster propellant such as is known in the art. Ignition of the gas generant causes a rapid production of hot inflation gases in first chamber 20. The inflation gases flow into projection chamber 87, impinging upon piston surface 41. As the propellant combusts, the internal pressure in projection chamber 87 increases, acting on piston 40 and causing the associated sleeve 90 to move in the direction indicated by arrow "B", against the biasing force exerted on the sleeve by spring member 50. Pressure relief orifices 90a act to release gases escaping into the clearance gap between projection 83 and sleeve 90, to aid in limiting the contribution of these gases to movement of the sleeve during operation. Thus, it is believed and intended that a preponderance of the forces producing movement of the sleeve will be attributable to the pressure acting on piston surface 41. The spring constant of spring member 50 may be specified to enable sleeve 90 to move in direction "B" in response to a predetermined minimum inflation gas pressure acting on piston 40. For example, in the embodiment shown in FIGS. 1-6, the spring constant is specified to enable piston to move in direction "B" when the system internal pressure reaches a pressure residing at a midpoint of an ideal pressure range for combustion of gas generant 16 within the gas generating system. When the product of this predetermined inflation gas pressure and the area of piston face 41 becomes greater than the force exerted on sleeve 90 by spring member 50, piston 40 and sleeve 90 will begin to move in direction "B".

Pressure values much beyond this predetermined value of internal pressure may lie outside the desired pressure range. Thus, the pressure regulation mechanism is designed such that movement of piston 40 a certain distance in direction "B" opens side holes 89 to allow exit of inflation gas, thereby relieving pressure to prevent the inflation gas pressure from exceeding the desired pressure range. A greater pressure increase within the gas generating system housing produces a correspondingly greater movement of piston in direction "B", thereby uncovering more of side holes 89 and enabling a greater volumetric flowrate of inflation gas through the holes and further relieving the system internal pressure. Thus, the total open area of pressure regulation side holes 89 is proportional to the system internal pressure.

In addition, as the combustion reaction progresses and the system internal pressure begins to drop, spring member 50 forces piston 40 in direction "A", thereby covering more of side holes 89 and reducing the volumetric flowrate of inflation gas through the holes, and correspondingly compressing the gas remaining in the system to maintain the system internal pressure within the optimum range for the combustion reaction.

Figure 4:
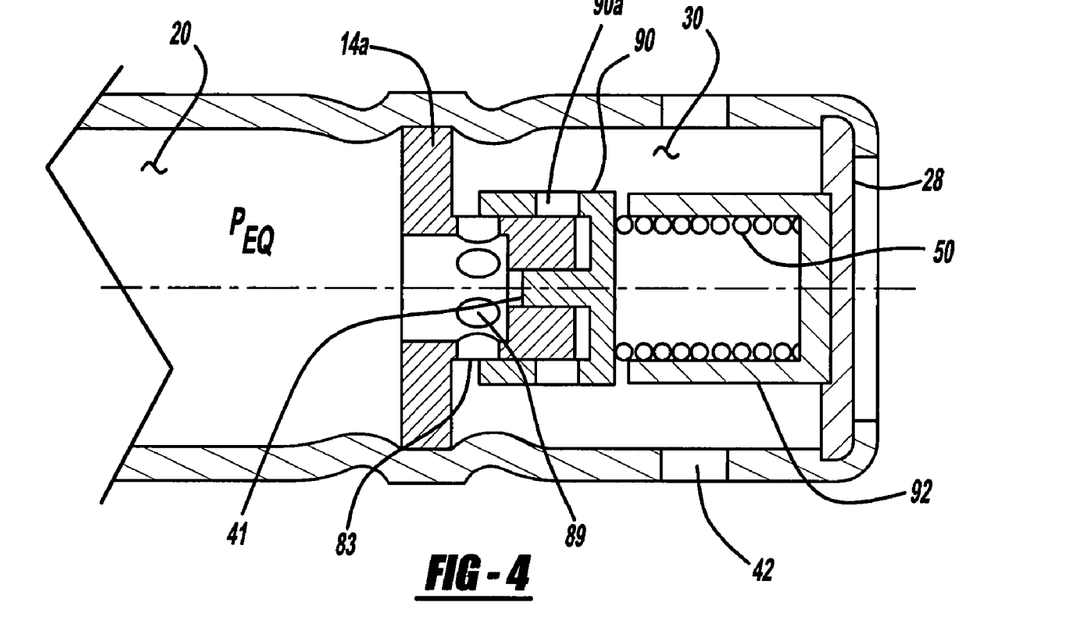
Figure 5:
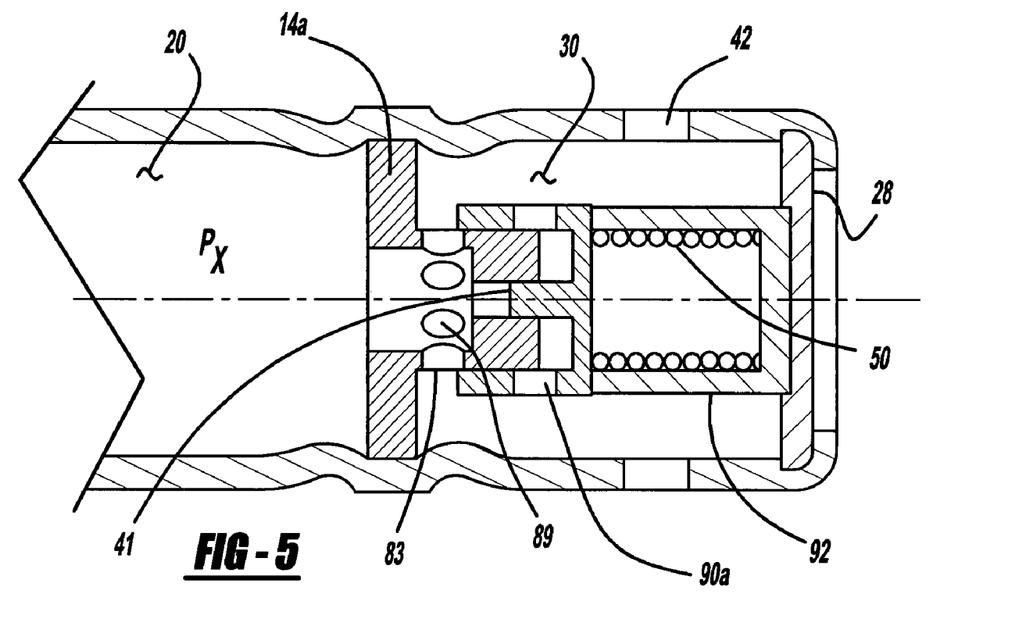

FIGS. 3-5 show movement of piston 40 and sleeve 90 upon activation of the gas generating system. In FIG. 3, a threshold internal pressure $P_T$ necessary to begin movement of piston 40 has just been reached, and the force on piston 40 substantially equals the force exerted on sleeve 90 by spring 50.

In FIG. 4, the internal pressure in chamber 20 has exceeded the threshold pressure $P_T$ and the resulting force on piston surface 41 has overcome the opposing spring force on sleeve 90, thereby moving the sleeve and opening side holes 89 an amount sufficient to maintain a substantially steady pressure $P_{EQ}$ through a large portion of the combustion reaction.

FIG. 5 shows an excessive pressure condition $P_X$ in chamber 20, in which sleeve 90 abuts stop member 92, thereby preventing further motion of the sleeve and further opening of side holes 89.

In summary, as the generated gases expand into chamber 87 and second bore 88 in response to increased internal housing pressure, sleeve 90 moves against the force exerted by spring 50, thereby exposing a greater area of gas exit aperture along projection 83 and resulting in a drop in the internal pressure. This reduces the pressure force acting on sleeve 90, enabling spring 50 to force the sleeve back, effectively contracting the gas generating system combustion chamber. As the combustion chamber volume contracts in response to the drop in pressure resulting from the gas release (or from a decrease in gas generation rate), and as the total open area of gas exit apertures 89 decreases due to reverse motion of the sleeve, the internal housing pressure increases. By providing a pressure regulation system having low mechanical inertia, the pressure regulation system is able to rapidly respond to changes in pressure resulting from variations in gas generation rate, by either effectively expanding the combustion chamber volume to expose a greater gas exit aperture area (thereby reducing internal pressure), or by effectively contracting the combustion chamber volume to expose a smaller gas exit aperture area (thereby increasing internal pressure). Thus, the arrangement described herein provides a combustion chamber having a volume which is effectively controllably expandable or contractible responsive to the combustion rate of the gas generant. In addition, the mechanism by which the combustion chamber is expanded or contracted also regulates the gas exit aperture area available to the generated gases for flow therethrough.

Stated another way, the flow control system of the present invention utilizes a closure member which is coupled to the divider so as to constrict the fluid flow path through the divider responsive to a sum of the first and second forces acting on the closure member. Also, as a greater internal pressure within the enclosure will result in a more pronounced displacement of sleeve 90, a degree of constriction of the fluid flow path will be effectively inversely proportional to the pressure within the enclosure.

It will further be appreciated that design considerations such as the type of propellant, the burn characteristics thereof, and the pressure tolerances of the vessel 10, combined with the spring constant of a given spring member 50, and the total area of the gas exit orifices may be iteratively harmonized to result in a desired average pressure within the pressured vessel 10. As such, when properly equipped with the data typically developed in gas generant manufacture, such as the pressure and temperature characteristics required for an optimized combustion of the propellant, other design criteria such as the number and size of gas exit orifices, and the type and spring constant of the spring member may be appropriately and iteratively selected to result in a pressure vessel that essentially maintains an optimized average pressure. In sum, the spring 50 and the total gas exit aperture area sealed by the piston 40 may be either singularly or jointly evaluated on a trial and error basis depending on the propellant composition desired.

In another embodiment (not shown), a torsion spring is used to rotationally bias the piston into a position in which it blocks the pressure regulation apertures prior to gas generating system activation. After system activation, a suitable increase in pressure produces a rotational motion of the piston against the torsion force exerted by the spring, which gradually uncovers the pressure regulation apertures to relieve excess internal gas pressure. As the pressure drops, the torsion spring acts on the piston to counter-rotate the piston, again gradually covering the apertures to block gas flow therethrough.

Gas generating system housings having configurations other than the cylindrical shape shown herein may be used, provided they are suitable for incorporating an embodiment of the pressure regulation mechanism described herein. Also, apertures 42 may have shapes (for example, holes) other than slots. In addition, the number and sizes of apertures 42 may be varied according to the pressure regulation requirements for the gas generating system.

The present invention helps to maintain the gas generating system combustion pressure within an optimum range during the majority of the combustion event by automatically and continually controlling the inflation gas exit aperture area. The pressure regulation mechanism disclosed herein greatly improves the ballistic performance of the gas generating system, while minimizing the generation of effluents due to low-pressure combustion.

Figure 6:
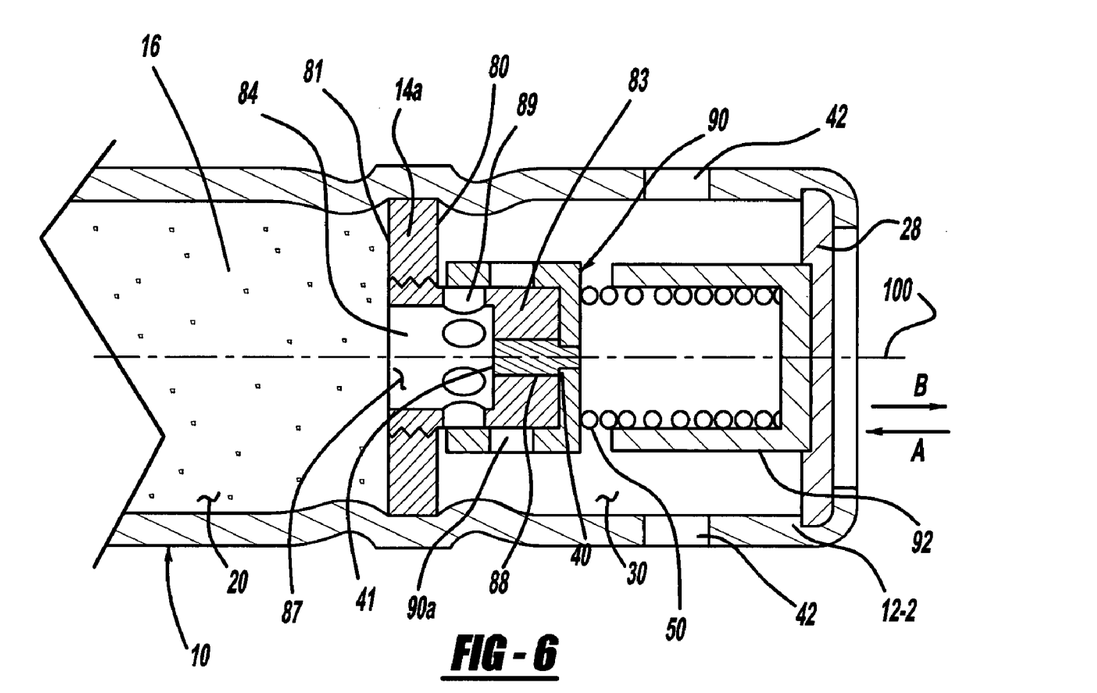
FIG. 6 shows an alternative embodiment of the gas generating system of the present invention.

Referring now to FIG. 6, the pressure regulation assembly described herein may also be "tuned" to provide any desired range of target pressures. In a particular embodiment, the projection 83 is attached to wall 14a using a threaded connection which permits adjustment of the starting position of sleeve 90, thus enabling the initial compression of spring 50 to be varied as desired. For example, increasing the initial compression of spring 50 correspondingly increases the threshold force which must be exceeded by gas pressure acting on piston 40 in order for the spring to be further compressed, and also increases the average internal pressure (or target pressure) at which the force on the piston will be balanced by force exerted by the spring. Inversely, the projection may be screwed further "into" the wall (in direction "A"), thereby decreasing the initial compression of spring 50 to correspondingly decrease the threshold force which be exceeded by gas pressure on piston 40 in order for the spring to be further compressed, and correspondingly decreasing the average internal pressure (or target pressure) at which the force on the piston will be balanced by force exerted by the spring.

The degree of pressure regulation may also be varied by suitably specifying the number, sizes, and spatial arrangement of gas exit side holes 89 along projection 83. For example, the lengths or positions of side holes 89 along projection 83 may be staggered such that portions of different ones of the side holes are opened as sleeve 90 proceeds in the direction indicated by arrow B.

Figures 7, 8:
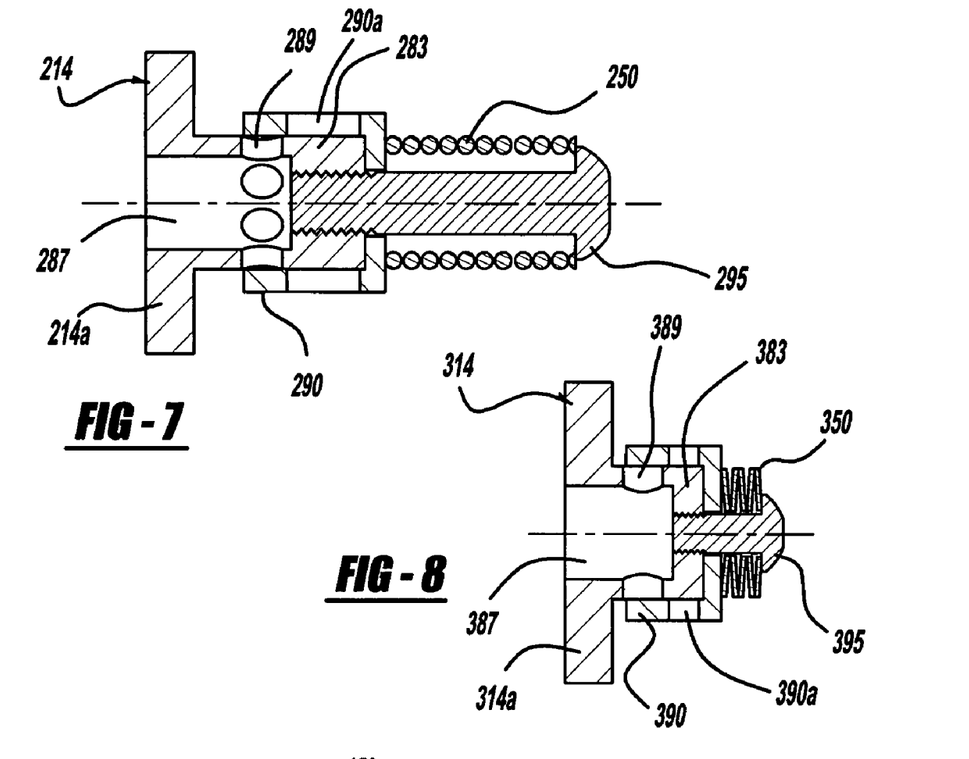
FIG. 7 shows another alternative embodiment of the gas generating system of the present invention.
FIG. 8 shows yet another alternative embodiment of the gas generating system of the present invention.

In FIGS. 7 and 8, elements of the invention similar to those previously described are given similar reference numerals. Referring now to FIGS. 7 and 8, in alternative embodiments of the gas generating system, the flow control mechanisms (including projections 283, 283, associated sleeves 290, 390, and associated spring members 250, 350 are located exterior of the housing body. FIGS. 7 and 8 show the flow control mechanisms schematically, mounted to an exterior of the gas generating system housing (not shown). In these embodiments, dividers 214, 314 effectively separate an interior of the gas generating system housing from an exterior of the housing. It is understood that chambers 287 (FIG. 7) and 387 (FIG. 8) are in fluid communication with the combustion chamber in the interior of the housing. In addition, associated spring retainer members 295, 395 are secured to respective projections 283, 383, for retaining and supporting spring members 250 and 350.

In the embodiments shown in FIGS. 7 and 8, openings 289 and 389 enable fluid communication between the interior of the gas generating system and an associated inflatable element of a vehicle occupant protection system (for example, an airbag). In addition, sleeves 290, 390 are dimensioned such that corresponding gas-release apertures 289, 389 are slightly open (near edges of their associated sleeves) prior to activation of the device. In these embodiments, movement of the sleeves 290, 390 is effected by radial discharge of high-pressure gases from openings 289, 389, thereby forcing the associated sleeves 290, 390 in direction "B" (see FIG. 2). Thus, the displacement of sleeves 290, 390 will be substantially proportional to the pressure of the radial discharge from openings 289, 389.

In the embodiments shown in FIGS. 7 and 8, any filter (not shown) employed would be positioned either within the system housing (not shown) along a gas flow path from the housing to chambers 287, 387, or within chambers 287, 387, to filter generated gases prior to the gases exiting the flow control system. In addition, if desired, projections 283 and 383 may be adjustably connected to their associated dividers 214 and 314 (using, for example, a threaded connection) as described for previous embodiments.

Figure 9:
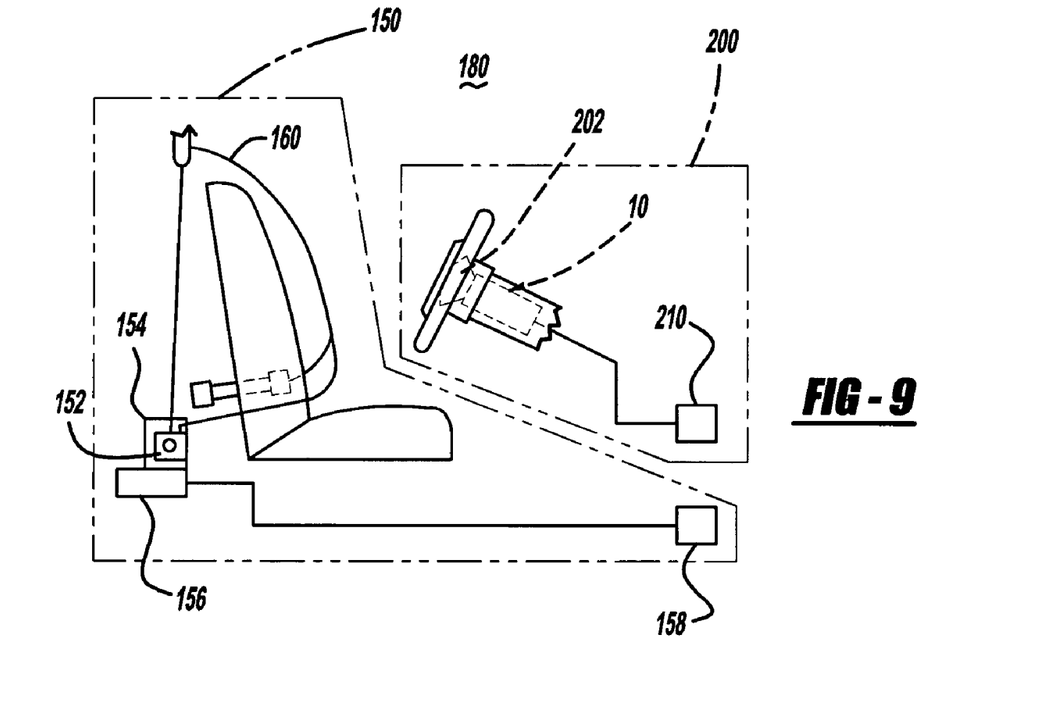
FIG. 9 is a schematic representation of an exemplary vehicle occupant restraint system including a pressure regulation mechanism in accordance with the present invention.

Referring to FIG. 9, a gas generating system including a gas generating system 10 as described above is incorporated into an airbag system 200. Airbag system 200 includes at least one airbag 202 and a gas generator 10 as described herein coupled to the airbag so as to enable fluid communication with an interior of the airbag upon activation of the gas generating system. Airbag system 200 may also include or be in communication with a crash event sensor 210 that is in operative communication with a crash sensor algorithm (not shown) which signals actuation of airbag system 200 via, for example, activation of igniter 62 (not shown in FIG. 9) in the event of a collision.

Referring again to FIG. 9, an embodiment of the gas generating system or an airbag system including a gas generating system in accordance with the present invention may be incorporated into a broader, more comprehensive vehicle occupant protection system 180 including additional elements such as a safety belt assembly.

Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667, 161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Exemplifying yet another gas generating system containing an gas generating system of the present invention, safety belt assembly 150 may also include or be in communication with a crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
   a housing;
   a divider for dividing an interior of the housing into a first interior portion and a second interior portion, the divider defining a fluid flow path therethrough enabling fluid communication from the first interior portion to the second interior portion; and
   a valve mechanism operatively coupled to the divider for constricting the divider fluid flow path responsive to a pressure within the first interior portion, whereby the pressure within the first interior portion is maintained at a value within a predetermined range; and
   a fluid flow path extending through the valve mechanism and enabling fluid communication between the divider fluid flow path and the second interior portion.

2. A flow control system for regulating a flow of fluid out of an enclosure responsive to a pressure within the enclosure, the flow control system comprising:
   a first fluid flow path enabling a flow of fluid out of the enclosure
   a valve mechanism in operative communication with the first fluid flow path for constricting the first fluid flow path responsive to the pressure within the enclosure, whereby the pressure within the enclosure is maintained at a value within a predetermined range; and a second fluid flow path extending through the valve mechanism to enable a flow of fluid between the first flow path and an exterior of the valve mechanism, wherein the first fluid flow path enables a flow of fluid around the valve mechanism.

3. A vehicle occupant protection system comprising a flow control system in accordance with claim 2.

4. A gas generating system incorporating a flow control system in accordance with claim 2.

5. A flow control system for regulating a flow of fluid out of an enclosure responsive to a pressure within the enclosure, the flow control system comprising:

a first fluid flow paht enabling fluid communication between an interior of the enclosure and an exterior of the enclosure;

a valve mechanism in operative communication with the first fluid flow path for constricting the first fluid flow path responsive to the pressure within the enclosure, whereby the pressure within the enclosure is maintained at a value within a predetermined range;

a second fluid flow path extending through the valve mechanism and fluidly connecting the first fluid flow path and an exterior of the valve mechanism;

a divider for dividing an interior of the enclosure from an exterior of the enclosure, the divider defining the first fluid flow path therein, and wherein the valve mechanism comprises:

a piston slidably engaged with the divider so as to enable fluid communication between the piston and the enclosure interior;

a closure member coupled to the piston so as to move in conjunction therewith; and a spring member operatively coupled to the closure member for exerting a force on the closure member, whereby a first force exerted on the piston in a first direction due to the pressure within the enclosure interior is opposed by a second force responsive to the first force, the second force being exerted on the closure member by the spring member in a second direction substantially opposite the first direction.

6. The flow control system of claim 5 wherein, when the pressure within the enclosure interior is at a value within the predetermined range, the first force is substantially equal to the second force.

7. The flow control system of claim 6 wherein, when the pressure within the enclosure interior is at a value within the predetermined range, the first force is equal to about 221 N and the pressure within the enclosure interior is equal to about 31 Mpa.

8. The flow control system of claim 5 wherein the closure member is coupled to the divider so as to constrict the first fluid flow path through the divider responsive to a sum of the first and second forces acting on the closure member.

9. The flow control system of claim 8 further comprising a stop member for restricting motion of the closure member.

10. The flow control system of claim 5 wherein a degree of constriction of the first fluid flow path is inversely proportional to the pressure within the enclosure.

11. The flow control system of claim 5 further including a divider for dividing an interior of the enclosure from an exterior of the enclosure, the divider defining the first fluid flow path therein, and wherein the valve mechanism comprises:

a closure member slidably engaged with the divider so as to enable fluid communication between the closure member and the enclosure interior, and a spring member operatively coupled to the closure member for exerting a force on the closure member, whereby a first force exerted on the closure member in a first direction due to the pressure within the enclosure interior is opposed by a second force responsive to the first force, the second force being exerted on the closure member by the spring member in a second direction substantially opposite the first direction.

12. A flow control system for regulating a flow of fluid out of an enclosure responsive to a pressure within the enclosure, the flow control system comprising:

a divider for dividing an interior of the enclosure from an exterior of the enclosure, the divider defining a fluid flow path enabling fluid communication between an interior of the enclosure and an exterior of the enclosure;

a valve mechanism in operative communication with the fluid flow path for constricting the fluid flow path responsive to the pressure within the enclosure, whereby the pressure within the enclosure is maintained at a value within a predetermined range, the valve mechanism comprising:

a piston slidably engaged with the divider so as to enable fluid communication between the piston and the enclosure interior;

a closure member coupled to the piston so as to move in conjunction therewith; and a spring member operatively coupled to the closure member for exerting a force on the closure member, whereby a first force exerted on the piston in a first direction due to the pressure within the enclosure interior is opposed by a second force responsive to the first force, the second force being exerted on the closure member by the spring member in a second direction substantially opposite the first direction, wherein the divider has a projection extending therefrom, the projection containing at least one hole formed therein to enable fluid communication between the enclosure interior and the exterior of the enclosure upon activation of the flow control system, and wherein the closure member comprises a sleeve slidably mounted on the projection so as to adjustably constrict the at least one hole responsive to the pressure within the enclosure interior.

13. The flow control system of claim 12 wherein the projection is adjustably connected to the divider.

14. The flow control system of claim 13 wherein the connection between the projection and the divider is a threaded connection.

15. The flow control system of claim 12 wherein the sleeve includes at least one gas-exit orifice formed therein.

16. A flow control system for regulating a flow of fluid out of an enclosure responsive to a pressure within the enclosure, the flow control system comprising:

a divider for dividing an interior of the enclosure from an exterior of the enclosure, the divider defining a fluid flow path enabling fluid communication between an interior of the enclosure and an exterior of the enclosure;

a valve mechanism in operative communication with the fluid flow path for constricting the fluid flow path responsive to the pressure within the enclosure, whereby the pressure within the enclosure is maintained at a value within a predetermined range, the valve mechanism including a closure member slidably engaged with the divider so as to enable fluid communication between the closure member and the enclosure interior; and a spring member operatively coupled to the closure member for exerting a force on the closure member, whereby a first force exerted on the closure member in a first direction due to the pressure within the enclosure interior is opposed by a second force responsive to the first force, the second force being exerted on the closure member by the spring member in a second direction substantially opposite the first direction, wherein the divider has a projection extending therefrom, the projection containing at least one hole formed therein to enable fluid communication between the enclosure interior and the exterior of the enclosure, and wherein the closure member comprises a sleeve slidably mounted on the projection so as to adjustably constrict the at least one hole responsive to the pressure within the enclosure interior.

17. The flow control system of claim of claim 16 wherein a portion of the at least one hole enables fluid communication between the enclosure interior and the exterior of the enclosure prior to activation of the flow control system.

18. The flow control system of claim 16 wherein the projection is adjustably connected to the divider.

* * * * *

UNITED STATES PATENT AND TRADEMARK OFFICE
CERTIFICATE OF CORRECTION

| | | |
|---|---|---|
| PATENT NO. | : 7,661,707 B2 | Page 1 of 1 |
| APPLICATION NO. | : 11/732851 | |
| DATED | : February 16, 2010 | |
| INVENTOR(S) | : Stevens et al. | |

It is certified that error appears in the above-identified patent and that said Letters Patent is hereby corrected as shown below:

Column 9, Line 23; Delete the second "283" and insert --383--.

Column 11, Claim 5, Line 13; delete "paht" and insert --path--.

Column 14, Claim 17, Line 5; Delete the first "of claim".

Signed and Sealed this
Fourth Day of January, 2011

David J. Kappos
*Director of the United States Patent and Trademark Office*